May 28, 1968  F. H. LEEUWRIK  3,385,236
PASTRY-MAKING PROCESS
Filed Feb. 24, 1965  2 Sheets-Sheet 1
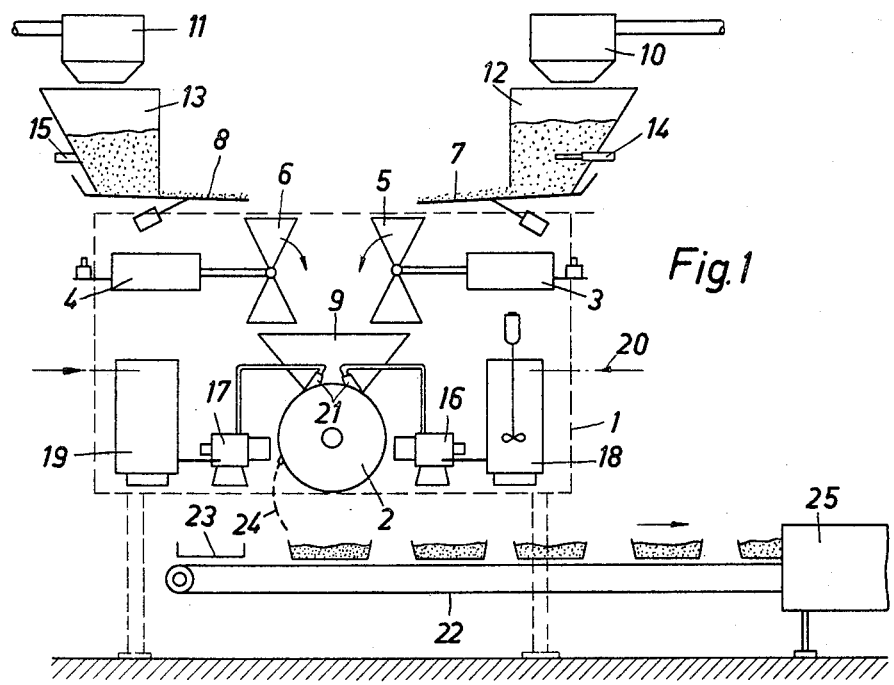
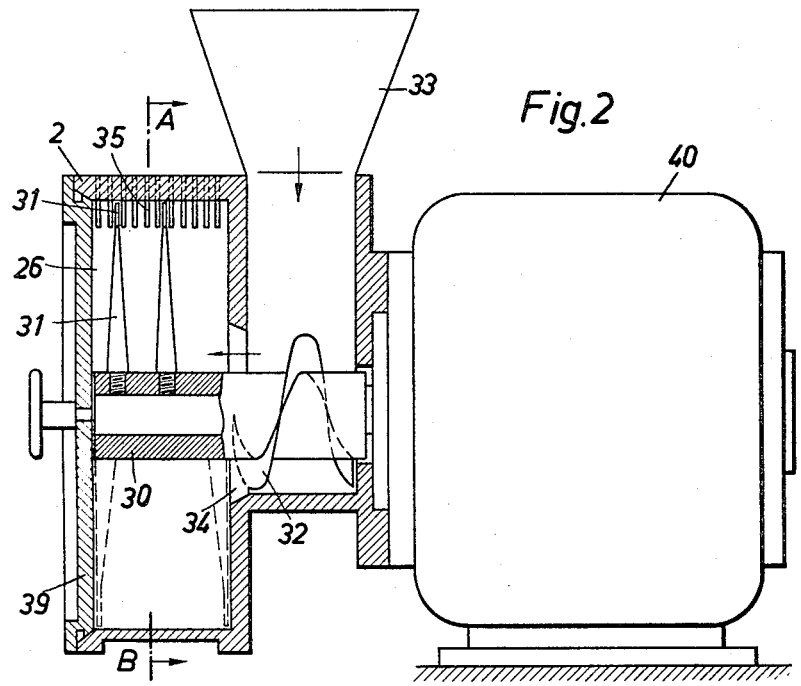

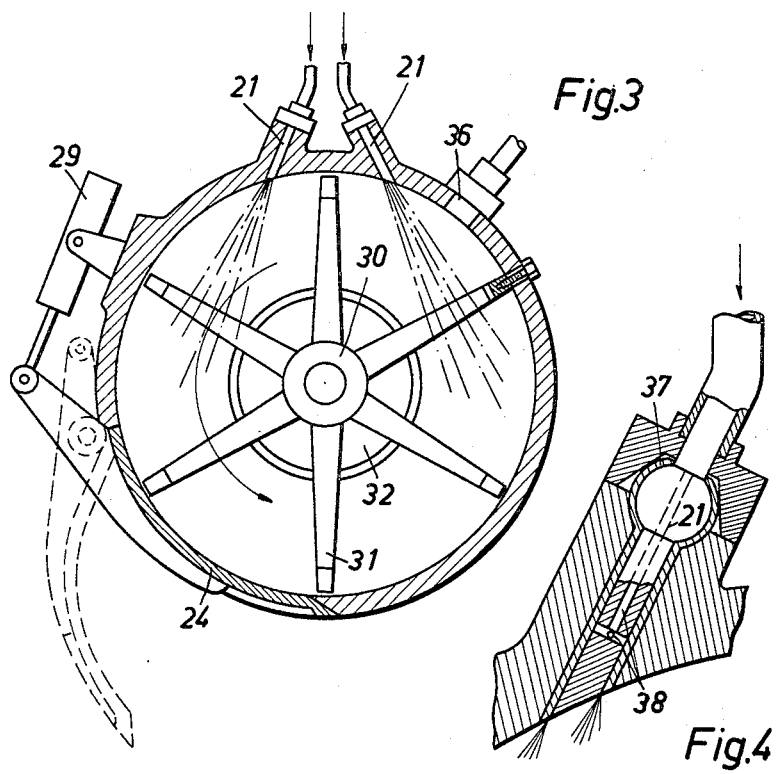
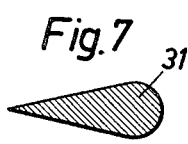
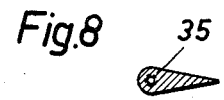
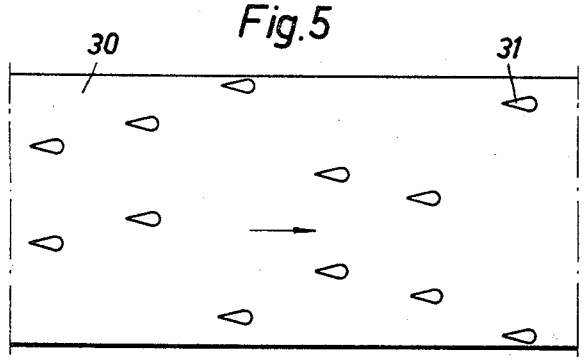
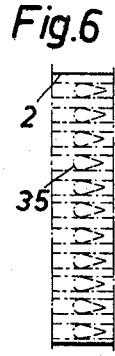

3,385,236
PASTRY-MAKING PROCESS
Frederik Hendrik Leeuwrik, Lochem, Netherlands, assignor to Werner Bahlsen, Hannover, Germany
Filed Feb. 24, 1965, Ser. No. 434,788
Claims priority, application Germany, Feb. 28, 1964, B 75,649
2 Claims. (Cl. 107—54)

This invention relates to a method of making pastry in which the flour, the mixing water with additives and, if requisite, other dough constituents are fed in the desired proportions in batches to a high-speed mixer and the dough forming is completely ejected from the mixer, omitting the kneading stage, and also to an apparatus for carrying out this method.

By comparison with the ordinary methods of production of pastry during which the constituents of the mixture must be thoroughly kneaded, such a method has the great advantages of speed, considerably reduced consumption of energy, less space required for the machine, no undesirable development of heat in the dough and a much more uniform composition of the dough with resultant uniform pastry dimensions, which is of great importance for automatic mechanical packaging of the pastry, for example cakes. Since the packages have a fixed interior size any deviations from the pastry sizes would result either in the package not being completely filled, if the cakes are too small, so that the cakes can shift against one another, or the prescribed number of cakes for a filling takes up more room than the interior space of the package, if the cakes are too large, so that in either case it is easy for breakage of the cakes in the package to occur.

With the hitherto known methods of this kind of pastry production, the whole mix constituents of the dough for a batch are fed simultaneously into the mixer and it has not hitherto been recognized that this causes a reciprocal interaction of the mix particles which prevents the optimum speedy formation of dough, so that the above mentioned advantages of such methods can only be obtained in part.

The object of the present invention is to secure these said advantages with certainty to an extent not hitherto attainable.

In accordance with the invention the mix constituents are fed into a high-speed mixer in succession in a fully determined manner, first of all the flour being brought to a floating condition in a preferably cylindrical mixing chamber by rapidly rotating mixing members, and the mixing water with additives then being added in finely distributed form and applied in a thin layer on the floating flour particles, after which if requisite the fat is distributed in the liquid condition in the same way as the mixing water on the moistened flour particles and the further additives such as sugar, spices and the like, are added to the mass which is kept continuously and thoroughly turbulent.

According to a feature of the present invention, the individual stages of the mix formation are distributed over a space of time of from 6 to 7 seconds.

It has been found that a stage of adding a mix constituent can begin shortly before the end of the preceding addition stage, without thereby detracting from the effectiveness of the method.

An advantageous apparatus for carrying out the method consists of a cylindrical mixing drum with a horizontal shaft for the mixing members, with an axial feed aperture for the solid constituents of the mix and with inlet apertures distributed over the peripheral surface for the liquid mix constituents.

It has been found particularly advantageous to feed in the solid constituents by means of a conveyor worm mounted on the shaft of the mixing members outside the mixing drum, which worm therefore runs at exactly the same high speed as the shaft of the mixing members.

In order to obtain as satisfactory as possible a floating condition of the flour constituent particles in the chamber, for producing a turbulent and thorough whirling of the contents of the mixing chamber, a row of pins are provided on the inside of the peripheral surface of the drum parallel to the shaft, through whose intermediate spaces run the ends of the mixing members.

It has been found that to attain this desired effect a single row of such pins is sufficient, and they may be comparatively short, for example only 15 mm.

In order to obtain as constantly uniform a quality of the dough as possible, it is necessary for the mixing drum to be freed after each mixing process as thoroughly as possible from the dough mass forming the batch.

In order to prevent mix constituents being deposited in the dead air zone of the rotating mixing members, according to a further feature of the present invention the mixing members may consist of conically outwardly tapering pins, which favors the centrifuging of the mix constituents by these pins through centrifugal force.

It is also possible in order to obtain particularly favorable results to make the cross section of such pins drop-shaped, the arcuate surface being used as the front side of the mixing member.

In order to cleanse the end faces of the cylindrical mixing chamber from adherent mixing constituents, the two outermost pins may be formed as scrapers for these drum end faces.

It has been found that the whirled material has a certain tendency to wander to both end faces of the drum during the whirling process. In order to counteract this undesirable heaping up of material, the pins on the shaft are arranged on worm surfaces impelling towards the central plane of the mixing chamber.

In order further to ensure a rapid and complete emptying of the mixing chamber, the closure flap for the discharge aperture may be formed as a part of the mixing drum peripheral surface.

It has been found by experiment that it is possible to obtain a complete emptying of each batch by the mixing drum formed in accordance with the invention.

The speed of rotation of the mixing members depends on the dimensions of the mixing drum, particularly the radial dimension. The mix constituents for optimum complete mixing must have a certain minimum peripheral acceleration.

It has been found advantageous for practical operation to use the following dimensions for a mixing drum, by which for instance about 1,300 kg. of dough per hour can be produced.

Overall drum diameter 550 mm., width of drum 150 mm., radius of the free annular space of the mixing chamber 220 mm. Arrangement of 12 mixing pins, of which two are formed as scrapers. Speed of rotation 900 to 1,000 revolutions per minute.

To produce bread there are fed into this mixing drum for instance 1½ kg. of flour and 1 kg. of other additives including water, corresponding to a dough yield of 2½ kg. per batch.

The mixing process itself lasts for about 6 to 7 seconds and the whole time from the beginning of production of a batch to the beginning of production of the following batch may take about 10 seconds.

These dimensions of the mixing drum correspond to the requirements of practice, particularly in large bakeries.

It is easily possible by increasing the drum diameter and by slightly widening the peripheral surface to obtain the possibility of dealing with considerably larger quantities of flour and additives in one batch. No call for such larger machines has hitherto been found in practice, as the machine dimensions indicated above, as appears from their capacity, are fully sufficient to meet requirements for dough and the like in the usual baking processes.

Certain limits are set to the width of the mixing drum by the requirement of feeding solid materials if requisite from both sides into the drum in such a way that in seconds a completely uniform whirling of these solid materials by the mixing members in the chamber of the mixing device is ensured.

It is, of course, also possible to feed through a hollow shaft which is provided over the whole width of the mixing drum with corresponding apertures for the emergence of the material being mixed.

It is possible by the manner of dough preparation in accordance with the invention to regulate the quantity of dough required for consumption in a simple manner each time, without any variation in formula, by making the pauses between the emptying of the mixing drum and its refilling of different lengths, which is possible by means of a simple time switch.

The metering of the dough constituents is particularly accurate because of the small batch quantities used and it is further possible to produce successive types of dough with different formulae, as it is particularly easy to vary the formula.

No time is lost in changing over the apparatus from one formula to another.

Reference must also be made to the particularly easy possibilities of cleaning the machine as mere warm water can be fed into this when running under no-load through the liquid nozzles, this water being brought in an extremely intensive manner to all the parts of the apparatus to be cleansed, by the speed of rotation of the mixing members.

Experience has shown that a preliminary washing and an after-rinsing are sufficient to ensure complete cleansing of the machine in accordance with the invention.

An apparatus embodying the invention will now be described by way of example with reference to the accompanying drawings, in which:

FIGURE 1 shows diagrammatically a dough-making machine embodying the invention,

FIGURE 2 is a vertical longitudinal section on a larger scale than FIGURE 1, through the mixer, FIGURE 3 is a vertical cross-section taken on the line AB in FIGURE 2, FIGURE 4 shows in section on an enlarged scale an injection nozzle, FIGURE 5 is a development of the rotor shaft, FIGURE 6 shows the arrangement and form of the pins in the mixing cylinder, and FIGURES 7 and 8 are cross-sections on a larger scale than all the other FIGURES of the mixing pins on the rotor shaft and the pins in the mixing cylinder, respectively.

The dough-making apparatus with the metering members for the mix components is preferably made as a closed unit in a housing 1 (FIGURE 1). For producing bread or short pastry for instance, two scales 3 and 4 for dry substances are provided above the rotary mixer 2, the scale 3 being used for instance for flour and the scale 4 for metering sugar. The dry substances are fed through vibrating chutes 7 and 8 on to rotating cups 5 and 6 provided in connection with the scales 3 and 4. When the design weight is reached the vibrating chutes 7 and 8 are switched off electrically by the scales 3 and 4. Simultaneously the rotating cups 5 and 6 rotate in the direction of the arrow *ab* and empty the material held therein into a hopper 9 of the mixer 2. The scales 3 and 4 can be so set that the rotary cups either rotate simultaneously or in succession. For producing short pastry the flour must be introduced first, that is to say before the sugar. There are however, other kinds of dough in which the dry substances must be introduced simultaneously or in a reverse sequence into the mixer.

In large-scale bakery work the dry substances are generally conveyed from silos pneumatically and fed through air-locks 10 and 11 into vibrating chute hoppers 12 and 13. The air-locks are switched on by filling-condition metering members 14 and 15 provided in the vibrating hoppers 12 and 13.

The liquid is metered through for instance piston pumps 16 and 17, by which the liquids are fed out of tanks 18 and 19. The tank 18 is here filled for instance with an emulsion of skim milk and ingredients dissolved in water, which are fed to the tank out of a dough container through the pipe 20. The tank 19 is filled with water. In this case the water is used exclusively for regulating the plasticity of the mixture, the proportions of the mix components, flour, sugar and liquid, remaining constant. The liquid is injected into the mixing chamber through nozzles 21. The whole metering process is effected in a set rhythm by known means completely automatically, by which the metering can be adjusted in a most simple manner.

Below the mixer is provided a conveyor belt 22 on which moulds 23 for instance for tin loaves are applied in succession. The metering of the mixer for tin loaf dough is in this case such that one filling of the mixer provides dough for a 1 kg. loaf. The conveyance of the moulds is controlled in such a way that as the rotary flap 24 of the mixer 2 opens the mould of a tin loaf is under the opening. As the dough must still rise a little, the loaves are conveyed on the conveyor belt 22 into a rise tunnel 25.

For producing a continuous strip of dough the speed of the conveyor belt 22 can be so controlled that the portions of dough deposited from the mixer 2 lie against one another and are conveyed into a roller mechanism with rollers. The irregularities of the successive portions of dough are smoothed out by these rollers. The strip of dough thus produced can be fed on to another conveyor belt to further treatment stations.

The rotary mixer 2 (FIGURE 2) consists of a mixing chamber 26 in which a rotor 30 rotates about a horizontal axis at a speed of about 1,000 r.p.m. During the mixing the mixing chamber is completely closed and the flour is whirled about the horizontal axis. For opening a rotary flap or valve 24 (FIGURE 3) is provided which is opened and closed through a hydraulic cylinder 29 in the rhythm of the mixing periods. On the rotor 30 are provided mixing pins 31 in two rows, six in each over the periphery of the rotor spindle. For the mix components to move as much as possible towards the centre zone of the mixing chamber an arrangement of pins is made as shown in FIGURE 5 as a development of the rotor 30.

On the rotor shaft is provided a conveyor worm 32 which conveys the dry substances introduced in the hopper 33 through annular perforation 34 into the mixing chamber. Naturally because of centrifugal force the material tends to move towards the inner wall of the cylinder. In order to prevent this, and furthermore to obtain a high degree of turbulence of the material to be mixed, there are provided on the cylinder jacket mixer pins 35 arranged in succession like the teeth of a comb (FIGURE 6) which check the flow of movement, the flour being subjected to impact upon the fixed pins. The space between the pins 35 is such that the pins 31 can move freely.

On the upper part of the cylinder jacket the injection nozzles 21 (FIGURE 3) are so arranged that they spray moisture as much as possible between the rotor spindle and the inner wall of the mixing chamber. A ball valve 36 is provided for injecting dough for instance, which is in a fluid condition. The injection valves 21 are formed as non-return valves. For this purpose a rubber sheath 37 is drawn around the bored valve stem (FIGURE 4). The liquid is pressed through the bore 38 outwards between the valve stem and the rubber sheath and is thus sprayed circularly into the mixing chamber. The mixing chamber is closed by a cover 39. The rotor 30 is fixed direct on to the driving shaft of an electric motor 40, so that the mixer and drive form a closed unit.

The appliance represented works completely automatically and can be used for different operations simply by adjusting the metering members for producing mixes or dough. Similarly, the capacity range can easily be varied by increasing the metering capacity or by adjusting the cadence. It is also possible by arranging a number of mixers side by side to feed a conveyor belt for instance on which portions can then be placed in succession in rows.

While there is described above and illustrated in the drawing a particular high speed method of making pastry and an apparatus suitable for carrying out that method it will be appreciated that the invention is not limited thereto. Accordingly the invention should be considered to include all forms, variations and embodiments within the spirit and scope of the appended claims.

What is claimed is:

1. The high speed method of making individual batches of pastry dough within a high speed centrifugal mixer having rapidly rotating mixing members which consists in
   (a) introducing a desired quantity of flour into the high speed mixer,
   (b) subjecting the flour to rapidly rotating mixing members to render the flour into a floating condition,
   (c) spraying a desired quantity of finely divided water into the mixer thereby applying a thin layer of water on the floating flour particles,
   (d) continuing the mixing to form a mass of dough,
   (e) adding other additives as required to the mass and
   (f) subjecting the mass to further turbulence.

2. The method as in claim 1 wherein the individual stages of the mix formation are spread over a space of time of 6 to 7 seconds.

References Cited
UNITED STATES PATENTS 1,790,347   1/1931   Hawkins _____ 107—30 X WILLIAM I. PRICE, *Examiner.*